Jan. 12, 1965     C. W. ZIES     3,164,862
MEANS FOR CUTTING DEWATERED ELASTOMERS
Filed April 9, 1962     6 Sheets-Sheet 1

INVENTOR.
CARL W. ZIES
BY
Meyer, Baldwin, Doran & Egan
ATTORNEYS

Jan. 12, 1965   C. W. ZIES   3,164,862
MEANS FOR CUTTING DEWATERED ELASTOMERS
Filed April 9, 1962   6 Sheets-Sheet 3

INVENTOR.
CARL W. ZIES
BY
ATTORNEYS

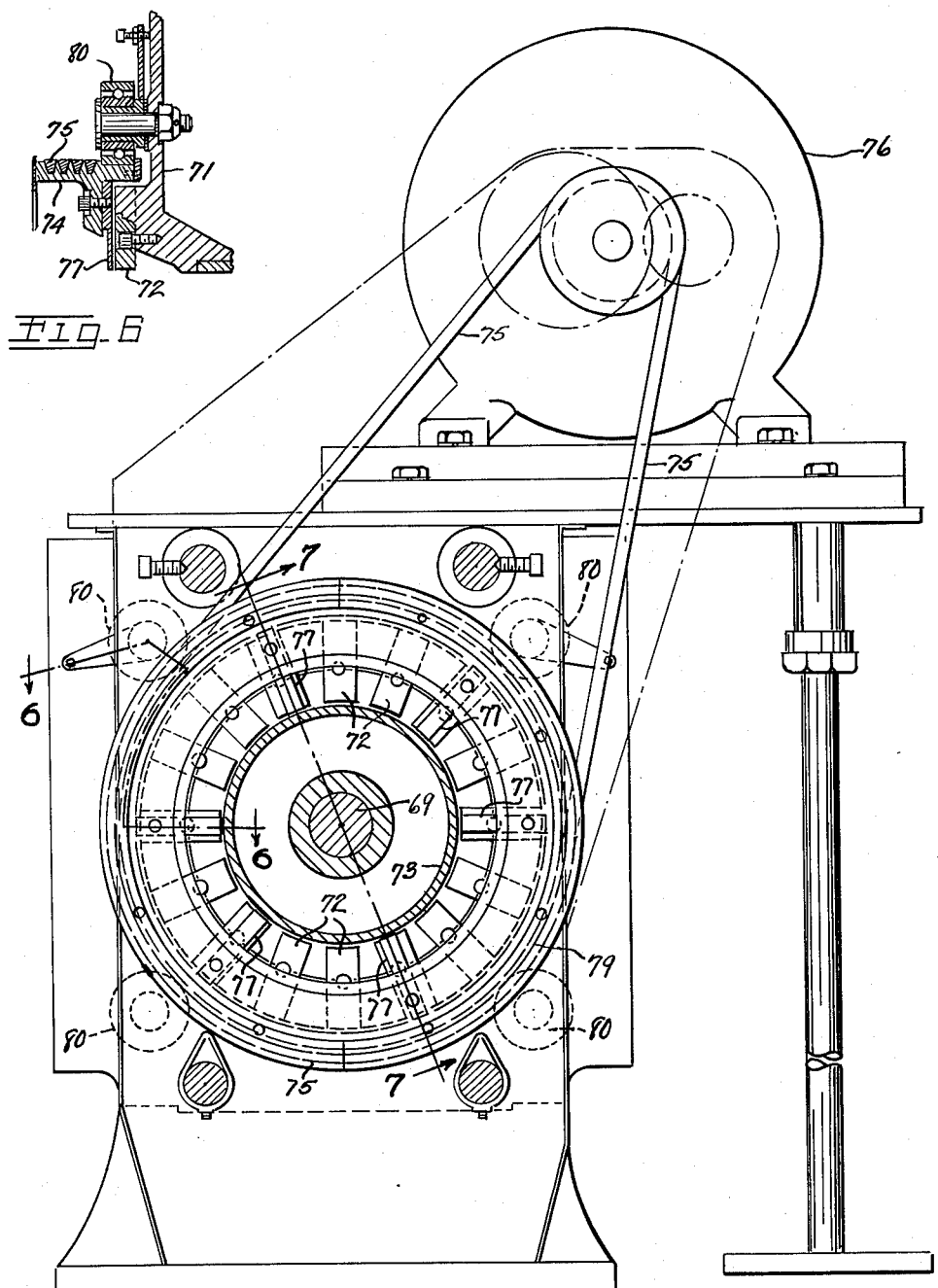

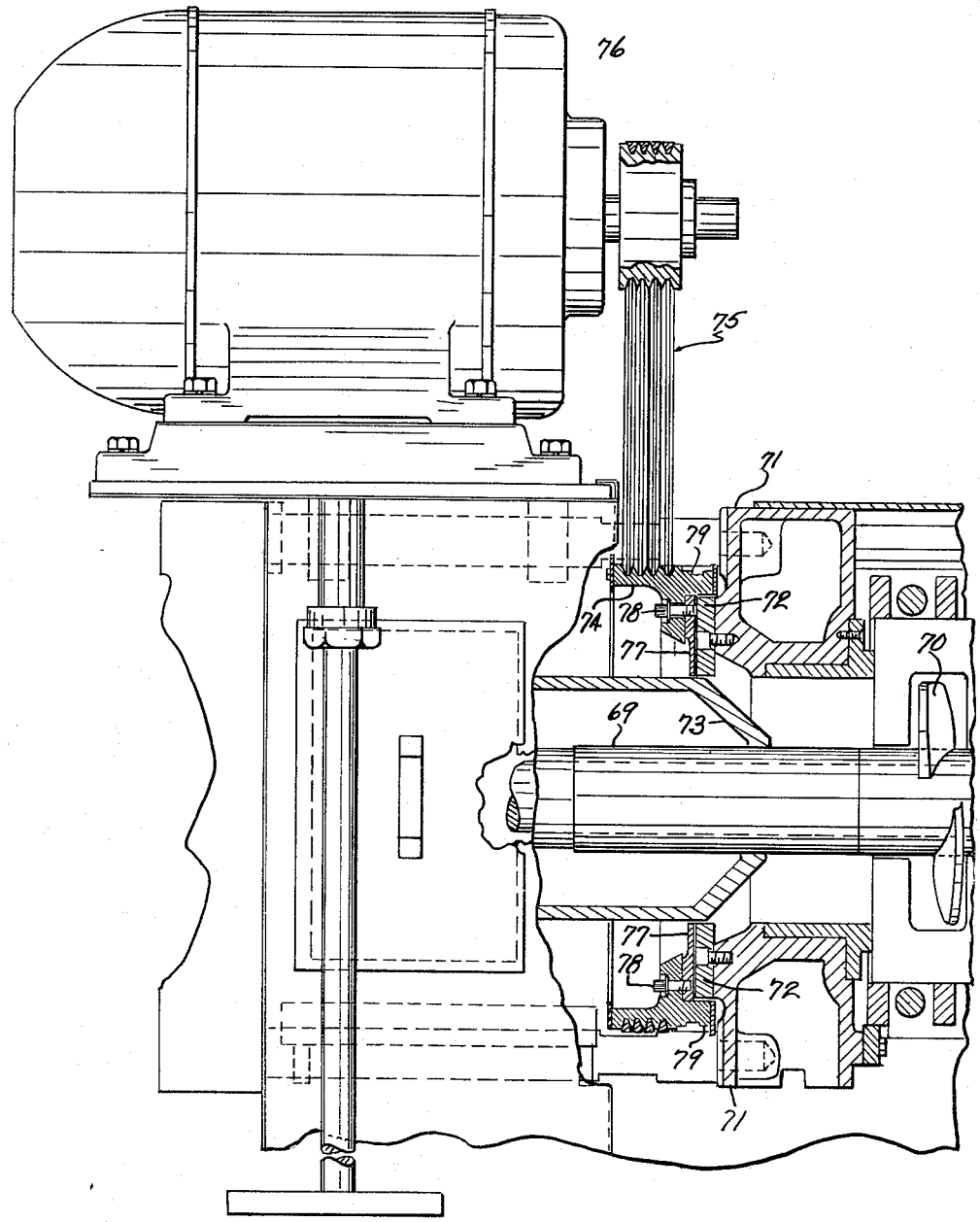

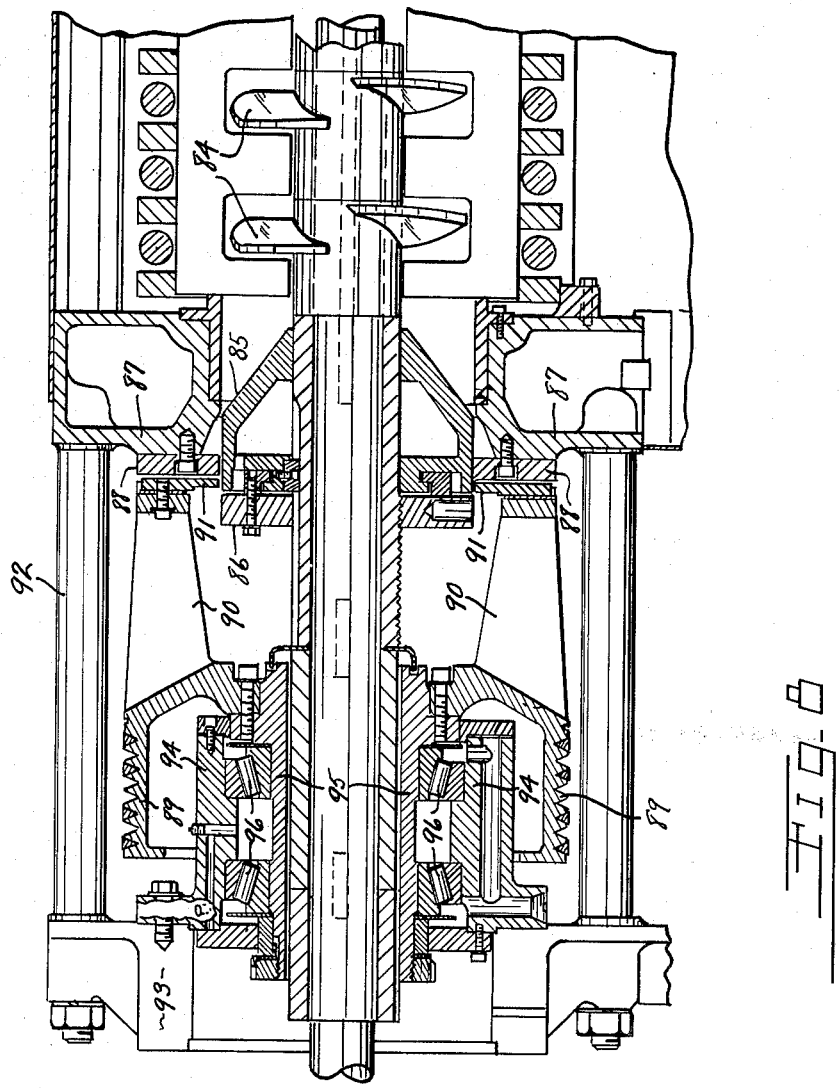

3,164,862
MEANS FOR CUTTING DEWATERED ELASTOMERS

Carl W. Zies, Lakewood, Ohio, assignor to International Basic Economy Corporation, New York, N.Y., a corporation of New York
Filed Apr. 9, 1962, Ser. No. 185,894
6 Claims. (Cl. 18—12)

This invention relates to improvements in screw presses which are used for the dewatering of synthetic elastomers. More specifically it relates to cutter means for reducing dewatered elastomers into particles suitable for finish drying.

Many rigid and non-rigid elastomers that are commercially produced today are polymerized in an aqueous medium. Some others may be polymerized in an organic solvent medium, but after polymerization it is customary to displace the organic solvent with water. In both cases the water must be almost completely removed from the elastomer prior to working the elastomer into finished forms.

One common method of dewatering these materials consists in subjecting the materials with their entrained water to the action of squeeze rolls, drainage screens, or filters, whereby the water content is reduced to values in the range of twenty five to thirty five percent. They are then processed in shredders, more commonly known as hammer mills, to reduce the particle size of the elastometric material to a degree that permits thermal drying of the material, which can be economically feasible. Partial dewatering of the elastomer by means of squeeze rolls, screens, and filtration is not an efficient method of water removal. Further, and of more importance, the shredding of the partially dewatered elastomer in a hammer mill for particle size reduction causes the formation of fines, which makes the subsequent thermal drying operation hazardous, and costly with respect to maintenance.

There are certain extrusion presses employed in the art today in which synthetic elastomers are dewatered by pressing out the water during movement of the elastomer through the press in one direction and permitting the water to retrogress, in a direction counter to movement of the elastomer, towards the feed end of the press. The water discharges from the press at a point further removed from the feeder of the unit. The dewatered solid is extruded through die openings at the discharge end of the press. Such extrusion causes asevere compaction of the elastomer so that the extruded particles have a non-porous structure.

Tests have been conducted wherein one-eighth inch diameter discharge openings have been employed with such presses in an attempt to make a relatively low diameter cylinder of elastomer for drying in thermal dryers. Such tests have not proven to be of sufficient economic value to warrant this mode of operation in commercial plants.

In my co-pending application, United States Serial No. 89,973, for Method and Means for Removing Moisture From Non-Rigid Elastomers, filed February 17, 1961, and now abandoned, I have disclosed dewatering equipment which permits an efficient removal of water from elastomeric materials. This present invention provides means for cutting dewatered elastomers such as are produced from apparatus shown and described in said co-pending application.

An object of the present invention is to provide novel and efficient cutting means for use with dewatering equipment of the type disclosed in my said co-pending application.

A further object of the invention is to provide novel and improved cutting means for producing particles of dewatered elastomer of a size and shape especially adapted for drying substantially the last vestiges of moisture therefrom.

A further object of the invention is to provide cutting means as defined in the last two preceding paragraphs which permits the reduction in size of the dewatered and cut particles without the production of fines.

Other objects and advantages will be apparent from a study of the following description of several embodiments of the invention, in conjunction with the accompanying drawings, in which:

FIG. 5 is a transverse sectional view through the discharge end of a helical screw dewatering press showing another embodiment of a cutting means.

FIG. 6 is a sectional view taken on the line 6—6 of FIG. 5

FIG. 7 is an elevational view of the apparatus of FIG. 5, about as seen from the left of FIG. 5, the view being partly in section as indicated generally by the section line 7—7 of FIG. 5.

FIG. 8 is a sectional view, generally similar to the showing of FIG. 5, but illustrating still another manner of carrying the set of rotating cutter blades.

Figure 1:
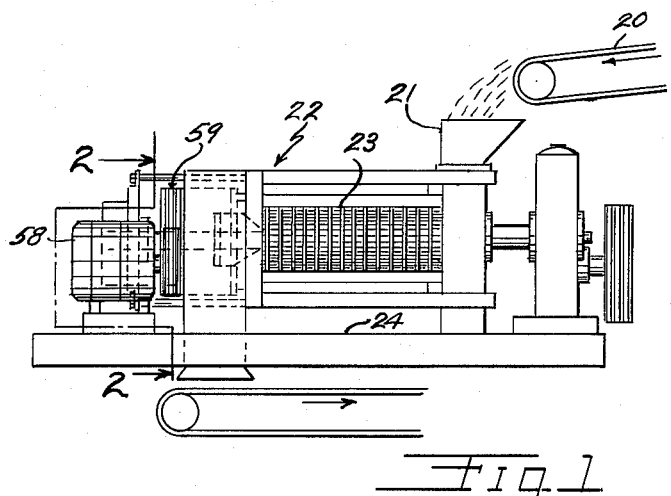
FIG. 1 is a side elevational view with many structural details omitted, showing one type of dewatering unit to which my novel cutting means can be readily adapted.

Referring first to FIG. 1 I show in simplified outline an apparatus for dewatering a slurried mixture of polymerized elastomer in water. The slurry is discharged from the upper right of the drawing, either from a conveyor 20, or from any suitable chute or pipe, into a receiving hopper 21 of dewatering unit 22. So-called "free water," namely gravity-drainage water in excess of about fifty percent, may be permitted to escape before the material enters the hopper. Removal of the free-flowing water can be accomplished by passing the elastomer-water slurry over an inclined perforate screen and over a vibrating screen. The elastomer continually advances through unit 22, during which advance a substantial amount of retained water is forcibly expressed. In this dewatering stage the water is reduced to between five percent and twenty percent by weight, depending on the particular composition and physical characteristics of the elastomer.

Figure 3:
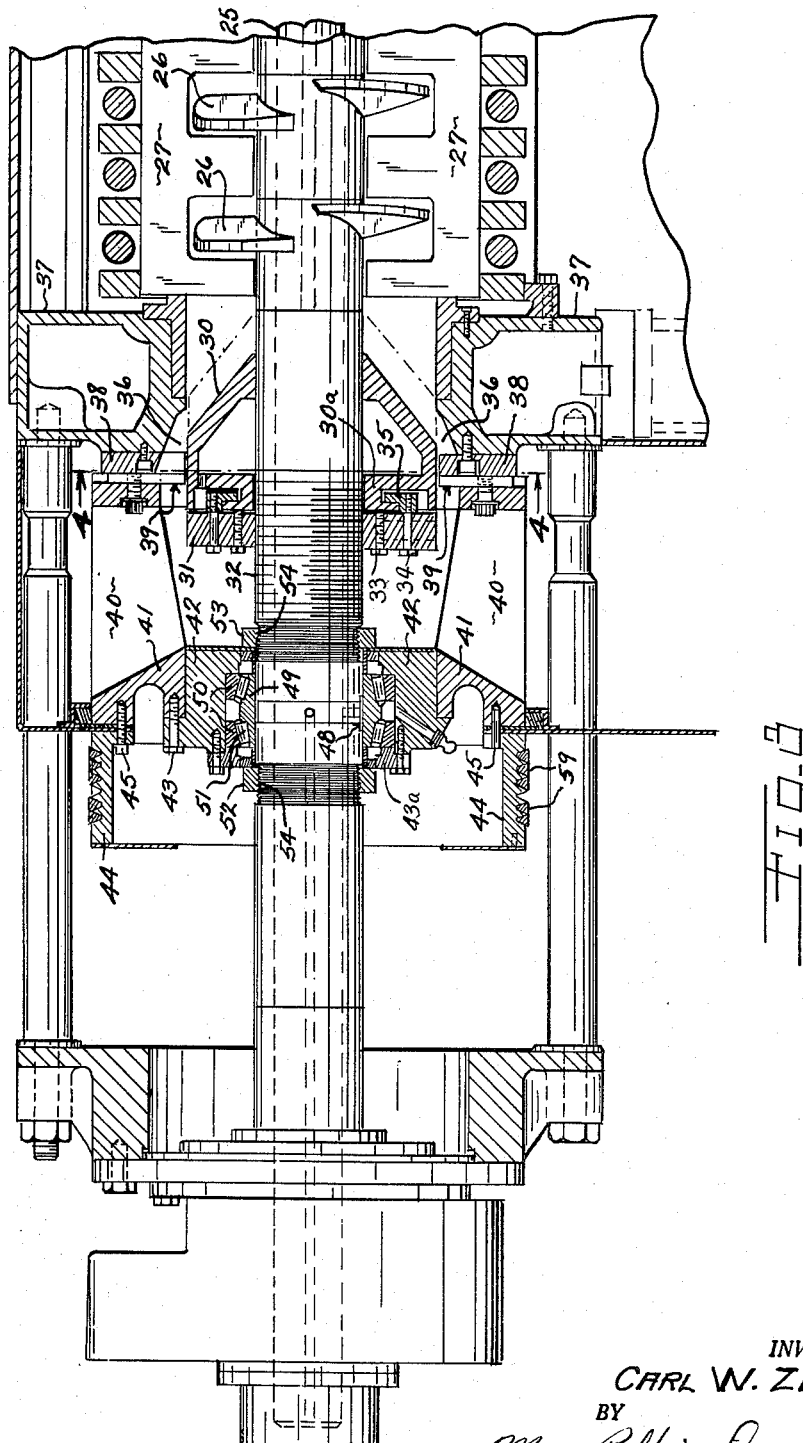
FIG. 3 is a longitudinal, axial, sectional view through the discharge end of a helical screw dewatering press showing an adjustable choke discharge control, in conjunction with a rotary and fixed cutter blade arrangement for accomplishing the objects of this invention.

One embodiment of dewatering unit is fully shown and described in my aforesaid co-pending application, Serial No. 89,973, so that its main features will need to be described herein only very briefly. The unit comprises an elongated barrel 23 carried on a fixed base 24. The elastomer passes through the barrel from the charging end, at the right (FIG. 1) being advanced to the left by a rotatable shaft 25, carrying helical screws 26 (FIG. 3). The barrel wall is provided with interstices, not shown, which permit the water to escape under the pressure of the rotating screw flights, but prevent the escape of solids. At diametrically opposed points within the barrel there are so-called "knife bars" 27 which extend inwardly between adjacent flights and prevent the material from rotating with the shaft, thereby forcing it to move to the left. In the progress of the elastomer through the barrel the excess water, down to between five and twenty percent, is squeezed out and escapes as above noted.

An adjustable choke 30 is movable to the left or right (FIG. 3) on the shaft, the desired position being attained by means of a hand wheel or nut 31 advanceable on the threaded periphery of a sleeve 32 on the shaft. The choke follows the hand wheel because of the push-pull arrangement of bolts 33 and 34 which connect the hand wheel with the split ring 35 interlocked with the rear wall flange 30a of the choke. Attention is directed to the annular clearance space 36 surrounding the choke. Obviously this space can be enlarged or reduced by endwise movement of the choke to the left or right. The elastomeric material is forced out through this annular clearance space 36 and then passes through a cutting zone defined by two sets of cutting blades, one set fixed and one set rotating, now to be described.

Figure 4:
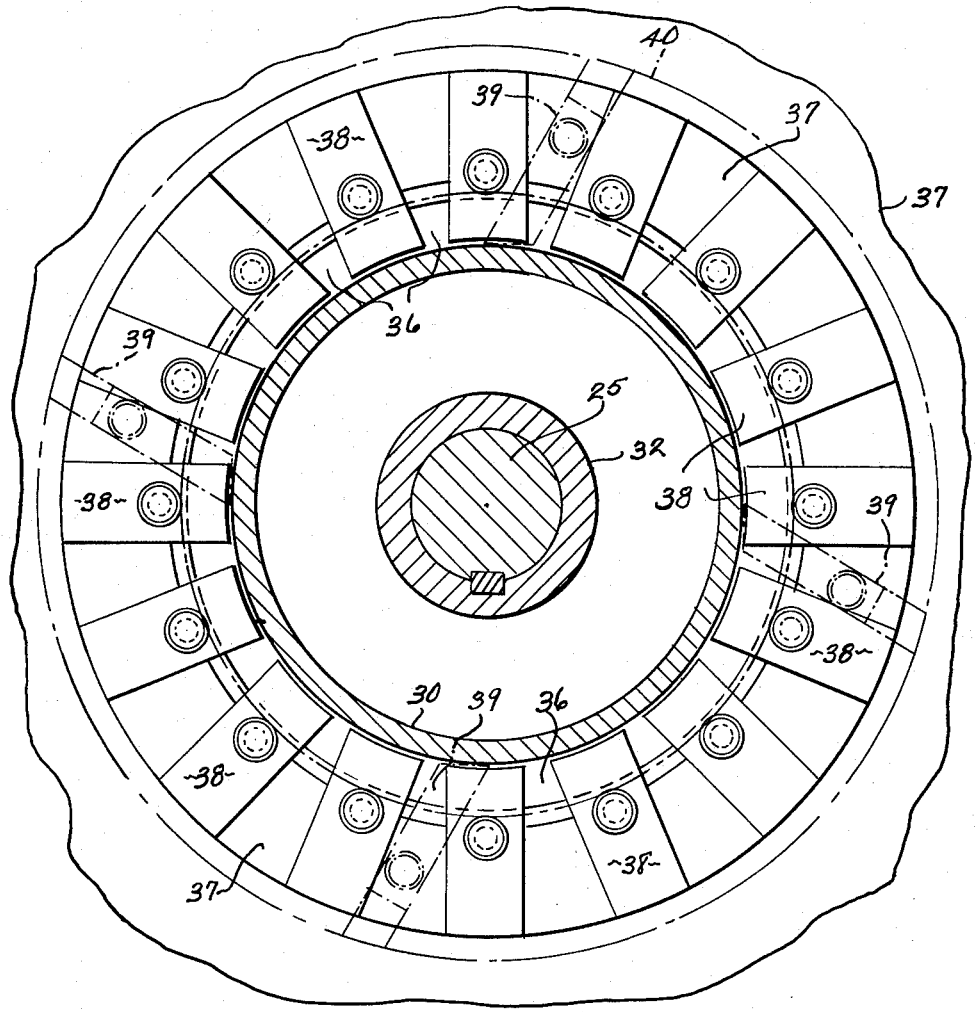
FIG. 4 is a transverse sectional view, somewhat enlarged, taken on the line 4—4 of FIG. 3.

The fixed frame or discharge frame at the left end of the press barrel comprises as end head 37 which cooperates with the choke to define the aforesaid annular space 36. The end head is fixed, and carries a circumferentially spaced series of fixed blades 38 (FIGS. 3 and 4) bolted to the end head, the cutting portion extending into the annular discharge space. These blades 38 cooperate with a circumferentially spaced series of whirling blades 39 which are carried, each on its respective extension arm 40, these arms extending to the right (FIG. 3) from the rotating cutter assembly. As will appear the cutter assembly includes the arms 40, a body including the members 41 and 42 which are secured together by bolts 43, and a sheave 44 secured to member 41 by bolts 45. The member 42 and an attached cap 43a serve as a retainer for a bearing assembly 48 which includes inner and outer bearing races 49 and 50 respectively and rollers 51. Lock nuts 52 and 53 complete the bearing assembly. It may be observed that the lock nuts may be advanced to right or left (FIG. 3) by rotation on the threads 54 on the shaft sleeve. (Conventional washers, shims, oil sleeves, guards, etc., are not described in detail since their presence and respective functions will be immediately apparent to anyone skilled in the mechanical arts.) This adjustability of course is necessary if the adjustable choke is moved, since the fixed and rotating blades must be maintained in suitable juxtaposition, and if the adjustable choke 30 is moved to the right or left (FIG. 3) to vary the area of the escape opening, the rotary blade assembly comprising blades 39, arms 40, and the sheave assembly 41, 42, 44, must be correspondingly shifted to maintain the proper cutting relationship of the fixed and rotating blades.

Figure 2:
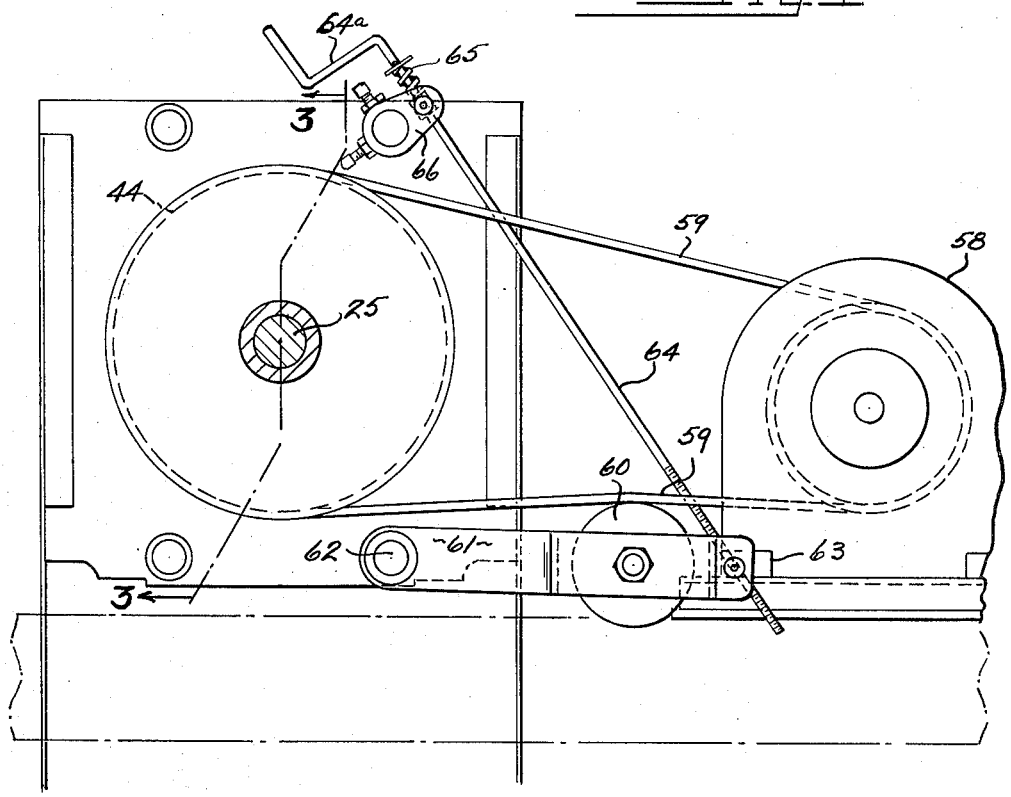
FIG. 2 is a view, somewhat enlarged from the scale of FIG. 1, and showing a motor and belt for driving a set of rotary cutter blades, there being manually adjustable belt-tensioning means.

The sheave 44 is driven by a motor 58 (FIGS. 1 and 2) through a multiple V-belt assembly 59. Tension on the belt is maintained as follows. An idler pulley 60 is carried on an arm 61 pivoted at 62 on the frame. A block 63 on the arm is threaded to receive the threaded end of an operating rod 64 which has an operating crank 64a on its upper end. Fixed on rod 64 is a washer which maintains a compression spring 65 between the washer and an adjustably movable upper block 66. It will be apparent from a glance at FIG. 2 that rotation of crank 64a tends to raise or lower the movable end of arm 61 and thereby maintain a respectively greater or lesser pressure of idler pulley 60 against the belt 59.

It will be obvious that any correlation between the speed of discharge of the compressed elastomeric material and the rotary speed of cutter blades 39, as well as their spacing and number in relation to the spacing and number of fixed blades 38, will produce any desired size of elastomeric particle. The present instance, with the blade arrangement shown in FIG. 4, the particle will be substantially rectangular in cross section.

Further in connection with the embodiment of FIGS. 1 to 4, it is obvious that the shaft 25 carries the adjustable choke with it in its rotation, and the rotating sheave to which are connected the rotating blades 39 can be turned in either direction at any desired speed dependent on motor speed and the use of gear change attachments.

The embodiment shown in FIGS. 5, 6 and 7 is generally similar to the one already described to the extent that it has a rotatable shaft 69 carrying worm flights 70; a fixed housing head 71 to which are attached spaced, fixed cutter blades 72; an endwise adjustable choke 73; a rotatable sheave 74 driven by belts 75 from a motor 76; and a set of rotatable blades 77 attached by bolts 78 to the sheave. In this embodiment an external peripheral portion 79 of the sheave serves as a bearing race for four rollers 80 carried by the fixed head portion 71 as best seen in FIG. 6. These rollers provide the only support and bearing for sheave 74.

In the embodiment shown in FIG. 8 I again show a rotatable shaft 83 carrying screw flights 84, and an endwise adjustably movable choke 85 the position of which is controlled by a hand wheel 86. A fixed housing 87 carries a peripherally spaced series of fixed blades 88; a rotatable sheave 89 has extending arms 90 which carry the rotating blades 91. A spaced series of rods 92 connect fixed housing head 87 with another end head 93. Fixed to this head 93 is an outer bearing race 94, and fixed to the sheave 89 is an inner bearing race 95. Between the outer and inner bearing races are roller bearings 96. Conventional lubricating passages and seals will be seen by those skilled in the mechanical arts. Here again, as in the prior described embodiments, the issuing elastomer, compressed by the high pressure in the screw press, can be cut into sized fragments depending on the rotational speed of the sheave, the extrusion speed of the elastomer, and the relative numbers of the fixed and rotating blades.

As previously stated, the most common means of drying synthetic rubbers today involves the partial dewatering of a synthetic rubber-water slurry to a material containing 25–35% moisture, followed by reducing the particle size of the rubber material in a hammer mill. The resultant particles are normally approximately 1/8″ in diameter. Such material is picked up in an air stream from the bottom of the hammer mill and blown to apron dryers.

With the advent of incorporating carbon black into synthetic rubbers, for example butadiene-styrene copolymers in the rubber production plants, greater problems have been encountered with apron dryers. One hundred pounds or more of fines deposit in the apron dryers each hour. Such accumulation of finely divided rubber with carbon black presents a fire hazard. To protect against this hazard, apron dryers must be partially cleaned every few days and thoroughly cleaned every few weeks. This necessitates a shut-down of the dryer and thereby a loss of production, which further results in a loss of product. In one plant 7750 pounds per hour of a carbon black butadiene-styrene copolymer black master batch was being processed by the standard mode of operation. Some statistical information is given in Example A herewith:

*Example "A"*

|  | Standard Operation | Dewaterer-Cutter Operation |
| --- | --- | --- |
| Filter | Yes | No. |
| Hammer Mill | Yes | No. |
| Rate, #/Hr | 7,750 | 7,750. |
| Drier Fines, #/Hr | 100 | 10. |
| H20 in Dried Rubber | 0.15–0.30 | 0.12–0.14. |

As shown, the amount of fines accumulating in the apron dryer amounted to an average of 100 pounds per hour. A dewatering press as defined in my copending application, U.S. Serial No. 89,973, for Method and Means for Removing Moisture From Non-Rigid Elastomers, filed February 17, 1961, was subsequently installed in this plant. Although the amount of moisture in the dewatered rubber was reduced below that previously obtained on a vacuum drum filter, and although the through-put rate of the apron dryer was thereby increased, the amount of fines in the dryer was not decreased. This latter circumstances arose from the fact that the dewatered rubber still required a particle size reduction in a hammer mill. A cutter apparatus constructed in accordance with the present invention, was installed on the dewatering device. As the data in example A state, the amount of fines in the dryer was reduced 90% and the decrease of drying in the apron dryer was improved noticeably.

In a second plant, indicated as Example B, a carbon black butadiene-styrene copolymer black master batch was being processed at the rate of 5000 pounds per hour through a rotary vacuum drum filter, a hammer mill and an apron dryer. The results are given in Example B herewith:

*Example "B"*

|  | Standard Operation | Dewaterer-Cutter Operation |
| --- | --- | --- |
| Filter | Yes | No. |
| Hammer Mill | Yes | No. |
| Rate, #/Hr | 5,000 | 6,200. |
| Drier fines, #/Hr | 40 | 0.0. |
| H20 in Dried Rubber | 0.3 | 0.24. |

With this operation, as shown in the tabulation, 40 pounds per hour of fines accumulated in the apron dryer. By installing the dewatering device mentioned above and the cutter means of this application, the throughput rate of the apron dryer was increased 24% to 6200 pounds per hour. No measurable fines accumulated within the apron dryer. The moisture content of the dried rubber was decreased slightly.

The above examples demonstrate that by means of this invention the accumulation of fines in apron dryers is greatly reduced; thus the loss of rubber and production through shut-down time are reduced to a negligible amount. In addition the fire hazards of the operation are minimized.

What is claimed is:

1. Apparatus for cutting dewatered elastomeric material as it issues from a screw press barrrel, said apparatus comprising means including a rotatable shaft with helical screw flights thereon for advancing and compressing said material in said barrel, means providing a limited area discharge opening of annular contour through which the material is ejected, a first set of cutting blades fixed and spaced circumferentially around and within said opening, a second set of cutting blades disposed in spaced, circumferential relationship adjacent said fixed blades and supported on said shaft in cutting relationship with said fixed blades, first power means for rotating said shaft and second power means for imparting rotary motion to said second set of blades independently of shaft rotation whereby each moving blade cooperates in turn with each fixed blade to cut into predetermined sized fragments the material issuing through said annular opening.

2. Apparatus as defined in claim 1 wherein said means for providing a limited area discharge opening comprises a conical choke member movable axially on said shaft whereby to increase or decrease the area of the discharge opening.

3. Apparatus as defined in claim 2 including means for adjustably fixing the position of said blade-carrying member axially along said shaft to thereby vary the axial distance between first set and said second set of cutting blades independently of the movement of said conical choke member.

4. Apparatus as defined in claim 1 including a blade-carrying member having a central aperture of a size suited to be telescopingly assembled on said shaft, said second set of blades being fixed on said blade-carrying member, means operatively connecting said second power means and said blade-carrying member for rotating said blade-carrying member on and relative to said shaft.

5. Apparatus for cutting dewatered elastomeric material as it issues from a screw press barrel, said apparatus comprising means including a rotatable shaft with helical screw flights thereon for advancing and compressing said material in said barrel, means providing a limited area discharge opening of annular contour through which the material is ejected, a first set of cutting blades fixed and spaced circumferentially around and within said opening, a second set of cutting blades disposed in spaced, circumferential relationship adjacent said fixed blades in cutting relationship with said fixed blades, means mounting said second set of blades for rotation relative to said shaft, first power means for rotating said power shaft and second power means for imparting rotary motion to said second set of blades independently of shaft rotation whereby each moving blade cooperates in turn with each fixed blade to cut into predetermined sized fragments the material issuing through said annular opening.

6. Apparatus for cutting dewatered elastomeric material as it issues from a screw press barrel, said apparatus comprising means including a rotatable shaft with helical screw flights thereon for advancing and compressing said material in said barrel, means providing a limited area discharge opening of annular contour through which the material is ejected, a first set of cutting blades spaced circumferentially around and mounted within said opening, a second set of cutting blades disposed in spaced, circumferential relationship adjacent said first set of blades in cutting relationship with said first set of blades, means mounting said second set of blades for rotation relative to said shaft and relative to said first set of blades, first power means for rotating said shaft and second power means for imparting rotary motion to said second set of blades independently of shaft rotation whereby each blade of said second set cooperates in turn with each blade of said first set to cut into predetermined sized fragments the material issuing through said annular opening.

References Cited in the file of this patent

UNITED STATES PATENTS

| 2,840,318 | Schnell | June 24, 1958 |
| 2,994,105 | Seal et al. | Aug. 1, 1961 |
| 3,044,514 | Schnell | July 17, 1962 |